Jan. 11, 1949.  R. H. GILMORE  2,458,846

ADJUSTABLE WORK GUIDE FOR SAW TABLES

Filed Dec. 17, 1946.  3 Sheets-Sheet 1

Inventor
Robert H. Gilmore

By *Clarence A. O'Brien and Harvey B. Jackson*
Attorneys

Jan. 11, 1949.    R. H. GILMORE    2,458,846
ADJUSTABLE WORK GUIDE FOR SAW TABLES
Filed Dec. 17, 1946    3 Sheets-Sheet 2

Inventor
Robert H. Gilmore

By *Clarence A. O'Brien and Harvey B. Jackson*
Attorneys

Jan. 11, 1949.   R. H. GILMORE   2,458,846
ADJUSTABLE WORK GUIDE FOR SAW TABLES
Filed Dec. 17, 1946   3 Sheets-Sheet 3
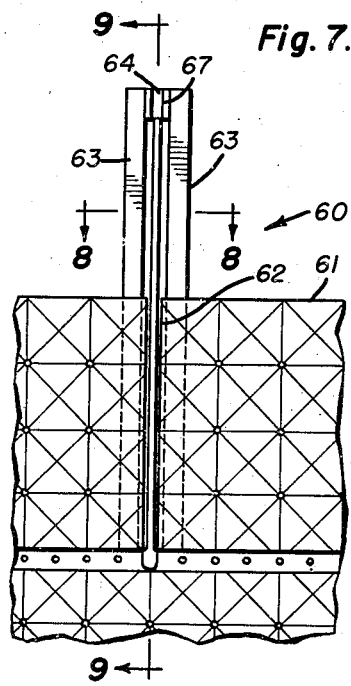
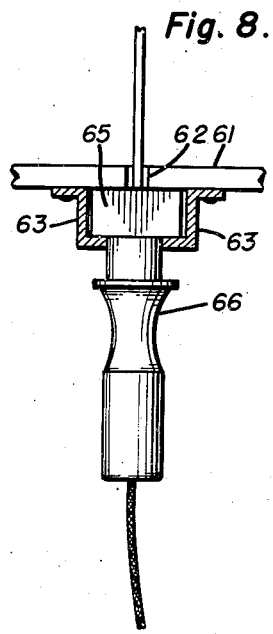
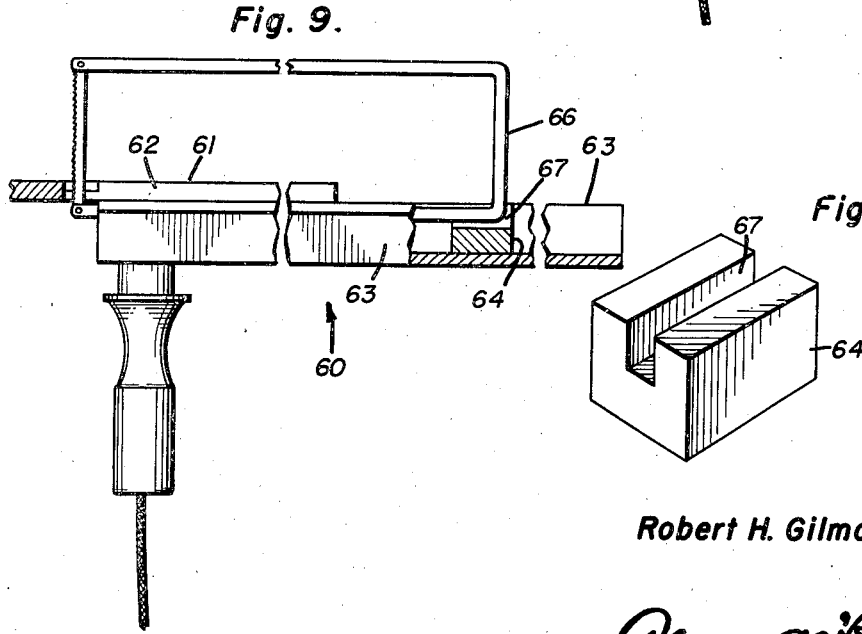
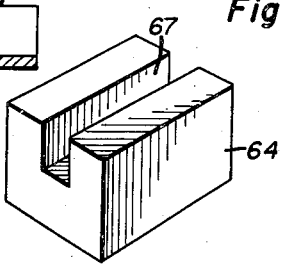
Inventor
Robert H. Gilmore
By *Clarence A. O'Brien and Harvey B. Jackson*
Attorneys Patented Jan. 11, 1949

2,458,846

UNITED STATES PATENT OFFICE 2,458,846

ADJUSTABLE WORK GUIDE FOR SAW TABLES

Robert H. Gilmore, Los Angeles, Calif.

Application December 17, 1946, Serial No. 716,801

1 Claim. (Cl. 143—175)

This invention relates to new and useful improvements and structural refinements in work supports for saws, and the principal object of the invention is to provide a device of the character herein described, such as may be conveniently and effectively employed in association with jig saws, scroll saws, band saws, or the like, for the purpose of supporting and guiding the work to the saw blade, or the saw blade to the work, as the case may be.

A further object of the invention is to provide a work support which, in effect, includes a plurality of attachments, the latter being adapted for adjustable and selective mounting upon the work supporting panel. The selection and use of the attachments depends, of course, upon the particular characteristics of the work.

Another object of the invention is to provide a work support in which the saw may be readily attached or removed.

An additional object of the invention is to provide a work support which is simple in construction and operation and which will not easily become damaged.

With the above more important objects in view, and such other objects as may become apparent as this specification proceeds, the invention consists essentially of the arrangement and construction of parts as illustrated in the accompanying drawings, in which:

Figure 7 is a fragmentary plan view showing a modified embodiment of the invention.

Figure 8 is a cross-sectional view, taken substantially in the plane of the line 8—8 in Figure 7.

Figure 9 is a cross-sectional view, taken substantially in the plane of the line 9—9 in Figure 7, and Figure 10 is a perspective view of a sliding block shown in Figure 9.

Like characters of reference are used to designate like parts in the specification and throughout the several views.

Referring now to the accompanying drawings in detail, the invention embodies in its construction a flat panel 10 which may, of course, be of any required size and supported in any desired manner, such as for example, by upright legs (not shown) or the like. The panel 10 is formed with an open slot 11 extending inwardly from and at right angles to one of the panel edges 12.

Figure 1:
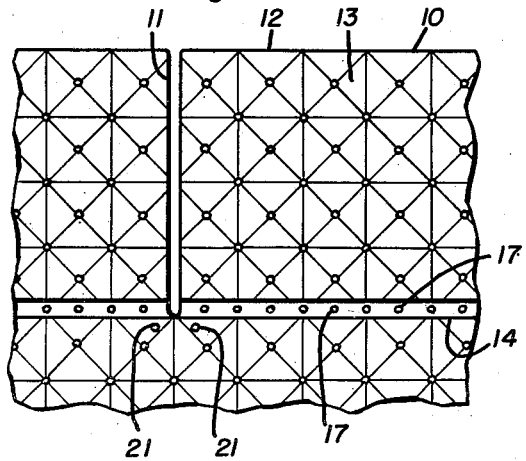
Figure 1 is a top plan view of a panel used in the invention.

The upper surface 13 of the panel 10 is formed with a channel-like groove 14, the latter extending at right angles to and communicating with the inner end of the aforementioned slot 11, as is best shown in Figure 1.

Figure 5:
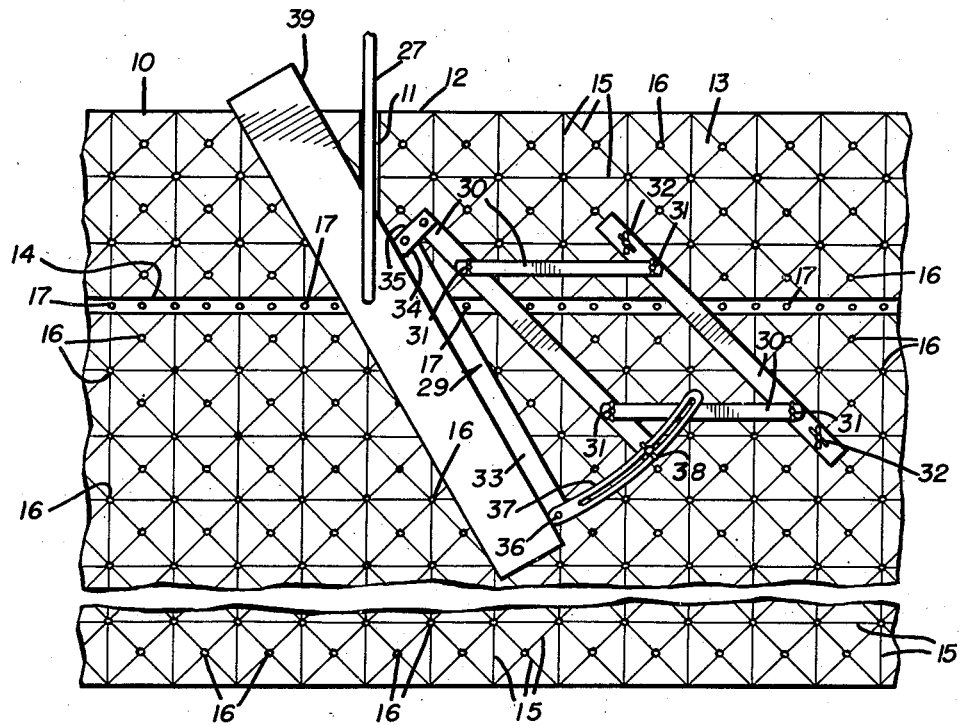
Figure 5 is a top plan view of the invention, showing one particular manner in which it may be used.

The surface 13 is inscribed with a series of intersecting guide lines 15, Fig. 5, these extending longitudinally, transversely and diagonally of the panel, as will be clearly apparent from the accompanying drawings. It will be noted that the longitudinal axes of the slot 11 and of the groove 14 are disposed in alignment with two of these guide lines.

The panel 10 is also provided with a plurality of apertures 16, these being disposed at the intersections of the lines 15. Further apertures 17 are provided at equally spaced intervals in the aforementioned groove 14.

Although the invention may be used with equal effectiveness with all sizes and types of scroll saws, jig saws, band saws, or the like, the panel 10 is particularly adapted for use with the electrically reciprocated tool which forms the subject matter of U. S. Patent No. 2,233,862. This tool or saw consists of a substantially U-shaped frame provided at the free end of one of its arms with a handle and equipped with a jig saw blade between the free ends of its arms, said blade being reciprocated by an electro-magnet positioned adjacent the handle.

Figure 2:
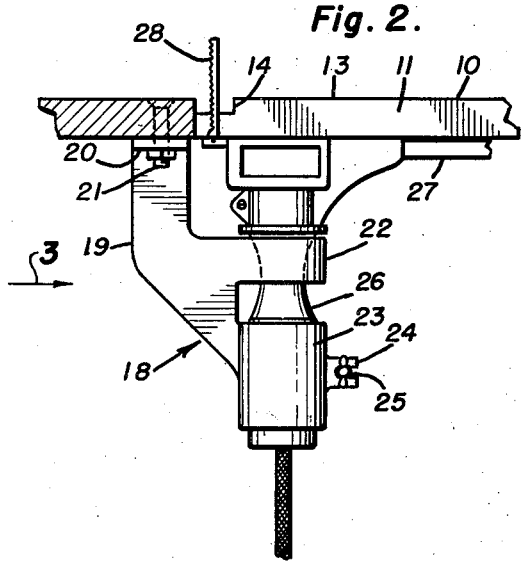
Figure 2 is an elevational view showing the attachment of the saw to the panel.
Figure 3:
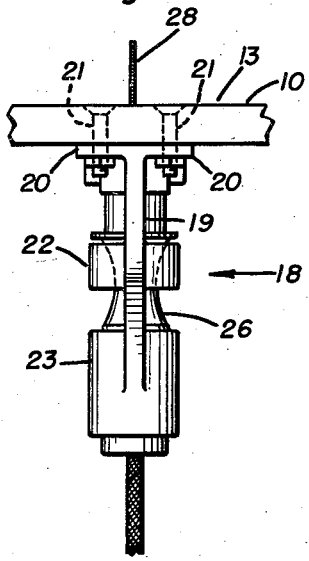
Figure 3 is an elevational view, taken in the direction of the arrow 3 in Figure 2.

The attachment of this saw to the panel 10 is accomplished by means of a clamp bracket designated generally by the reference character 18, the same consisting of an upright web 19 provided at the upper end thereof with a pair of out-turned ears 20. A pair of suitable screws 21, positioned in countersunk apertures provided in the panel 10, are employed for securing the ears 20 and the associated bracket to the underside of the panel. The web 19 is formed with a pair of tubular clamping members 22, 23, the latter being split for purposes of resiliency and being formed adjacent the split edges thereof with suitable lugs 24. A clamping bolt 25 is positioned in the lugs 24, whereby the clamp 23 may be tightened upon the handle 26 of the saw 27. It will be noted that the saw blade 28 will thus be disposed adjacent the inner end of the slot 11, more specifically, at the junction of the slot with the groove 14, as is best shown in Figure 2.

The work may be held on the surface 13 of the panel 10 in any suitable manner, such as for example, by simple screws passed through the work and through the apertures 16 or 17. Alternatively, the work may be guided as illustrated in Figure 5 by means of an adjustable frame designated generally by the reference character 29. This frame consists of four side members 30 pivotally connected together by means of wing bolts as at 31, one of said side members 30 being secured to the panel 10 by further wing bolts 32 positioned in suitable of the apertures 16. The protractor arm 33 is pivoted at one end thereof as at 34 to an extension 35 secured to another of the side members 30, the remaining end of the arm 33 being pivotally connected as at 36 to a slotted segment 37.

A wing bolt 38 passes through the slot of the segment 37 and engages the adjacent of the side members 30, whereby the positional relationship of the arm 33 with respect to the panel 10 may be adjusted in any desired manner, as will be clearly understood. The arm 33, of course, constitutes a guide for the work 39.

Figure 6:
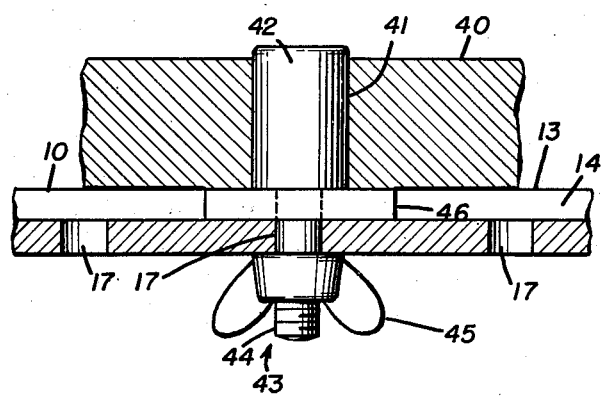
Figure 6 is a cross-sectional view of a retaining member used in the invention.

When the invention is employed for cutting work of circular form, the work 40 may be provided with a central aperture 41 to receive a cylindrical head 42 of a stud designated by the reference character 43. This arrangement is illustrated in the accompanying Figure 6 and it will be noted that the stud 43 includes a screw threaded shank 44 associated with the head 42, said shank being removably receivable in any of the apertures 16, 17 and being retained in position by a suitable wing nut 45. When the stud 43 is positioned in any of the apertures 17, a suitable spacer may be provided, as at 46, in the groove 14, to facilitate proper alignment of the work 40 with the surface 13.

The aforementioned spacer 46 may, if desired, be of any suitable length, possibly in the form of a strip which, if necessary, extends over the entire length of the groove 14.

Figure 4:
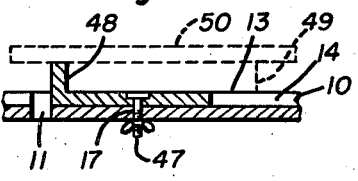
Figure 4 is a cross-sectional view of a guide used in the invention, illustrating the same in situ on the panel.

The cylindrical head 42 of the stud 43 may assume different sizes and configurations, a modification thereof being illustrated in the accompanying Figure 4 by the stud 47. This modified stud is employed in association with an L-shaped guide 48, the relatively long arm of which is disposed in the groove 14, while its relatively short arm projects upwardly from the groove, as will be clearly understood. This embodiment of the invention may be effectively employed for cutting of work with irregular marginal edges, for which purpose a template 49 may be temporarily secured to the work 50. It will be noted that by guiding the template 49 against the upstanding arm of the guide 48, the saw blade will cut the work in accordance with the contour of the template.

It will be also noted that in the foregoing embodiment of the invention, the work is guided (by various means) to the saw blade, while the saw and the work supporting panel (10) remain stationary. Somewhat different operational features are present in a modified embodiment of the invention presently to be described, wherein the work panel and the work remain stationary, while the saw is guided toward the work.

This modified embodiment of the invention is illustrated in the accompanying Figures 7-10 inclusively, and is designated generally by the reference character 60. The same embodies in its construction a flat panel 61 similar to the aforementioned panel 10, the panel 61 including an open slot 62, as will be clearly apparent.

A pair of channels 63 are secured to the undersurface of the panel 61 at the sides of the slot 62, the channels 63 being substantially Z-shaped in cross-sectional configuration and co-acting to form a guide for a sliding block 64.

This block resembles a similarly shaped magnet housing 65 provided on the saw 66, the latter being similar to the aforementioned tool which forms the subject matter of U. S. Patent No. 2,233,862.

The block 64 is provided with a recess or slot 67 in order that it may be pressed onto or otherwise suitably secured to the U-shaped frame of the saw, and the magnet housing 65, as well as the block 64, are slidably disposed between the channels 63, as best shown in Figure 8.

It will be apparent from the foregoing that when this embodiment of the invention is placed in use, the work may be attached to the panel 61 and the saw 66 may be guided toward the work so as to effect the desired cutting operation. The channels 63 may project somewhat beyond the marginal edge of the panel 61, so that the block 64 will remain in the guides 63 when the saw blade is disposed adjacent the marginal edge of the panel at the commencement of the cut.

It is believed that the advantages and use of the invention will be clearly understood from the foregoing disclosure and accordingly, further description thereof at this point is considered unnecessary.

While in the foregoing there has been shown and described the preferred embodiment of this invention it is to be understood that minor changes in the details of construction, combination and arrangement of parts may be resorted to without departing from the spirit and scope of the invention as claimed.

What I claim as my invention is:

In a work support for saws, the combination of a table provided with an opening to receive a saw blade and formed with a set of locating apertures, and a work guide positioned on said table and adjustable with respect to said opening, said guide comprising a primary bar and a secondary bar disposed in spaced parallel relation, spaced parallel links pivotally connecting said bars together and coacting therewith to define a parallelogrammatic frame, fastening elements provided on said primary bar and receivable selectively in said apertures whereby said frame is adjustably secured to said table, a work engaging and guiding beam pivotally connected at one end thereof to one end of said secondary bar and adapted to swing toward and away from the latter, an arcuate arm pivoted at one end thereof to said beam and formed with an arcuate slot, and an adjustable fastening means provided on said secondary bar and engaging said slot.

ROBERT H. GILMORE.

REFERENCES CITED

The following references are of record in the file of this patent:

UNITED STATES PATENTS

| Number | Name | Date |
|---|---|---|
| 194,237 | Green | Aug. 14, 1877 |
| 483,129 | Bennett | Sept. 27, 1892 |
| 570,931 | Jones | Nov. 10, 1896 |
| 1,113,152 | Clement | Oct. 6, 1914 |
| 1,502,088 | Colby | July 22, 1924 |
| 1,535,596 | French | Apr. 28, 1925 |
| 1,582,396 | Hanemann | Apr. 27, 1926 |
| 1,825,104 | Staeheli | Sept. 29, 1931 |
| 2,233,862 | Dremel | Mar. 4, 1941 |
| 2,310,813 | Sellmeyer | Feb. 9, 1943 |